United States Patent [19]

Aiba et al.

[11] 4,288,796

[45] Sep. 8, 1981

[54] PHASE DETECTION IN AN INK JET SYSTEM PRINTER OF THE CHARGE AMPLITUDE CONTROLLING TYPE

[75] Inventors: Masahiko Aiba; Ikuo Umeda, both of Nara, Japan

[73] Assignee: Sharp Kabushiki Kaisha, Osaka, Japan

[21] Appl. No.: 917,592

[22] Filed: Jun. 21, 1978

[30] Foreign Application Priority Data

| | | | |
|---|---|---|---|
| Jun. 27, 1977 | [JP] | Japan | 52-76752 |
| Jun. 28, 1977 | [JP] | Japan | 52-77501 |
| Jun. 28, 1977 | [JP] | Japan | 52-77502 |

[51] Int. Cl.³ .......... G01D 18/00

[52] U.S. Cl. .......... 346/75

[58] Field of Search .......... 346/75

[56] References Cited

U.S. PATENT DOCUMENTS

| | | | |
|---|---|---|---|
| 3,596,275 | 7/1971 | Sweet | 346/75 X |
| 3,769,627 | 10/1973 | Stone | 346/75 |
| 3,810,194 | 5/1974 | Tokunaga | 346/75 |
| 3,893,126 | 7/1975 | Ascoli | 346/75 X |
| 3,969,733 | 7/1976 | De Moss | 346/75 X |
| 4,025,926 | 5/1977 | Fujimoto | 346/75 X |

OTHER PUBLICATIONS

Lee et al., Fluid Droplet Printer, IBM Technical Disclosure Bulletin, vol. 16, No. 2, Jul. 1972, pp. 451–452.

*Primary Examiner*—Joseph W. Hartary
*Attorney, Agent, or Firm*—Birch, Stewart, Kolasch and Birch

[57] ABSTRACT

In an ink jet system printer of the charge amplitude controlling type, an electric current flows through an ink droplet issuance unit to ink liquid when an ink droplet is properly charged by charging means. A detection circuit is connected to the ink droplet issuance unit for detecting the electric current flowing through the ink droplet issuance unit, thereby developing a phase OK signal when a predetermined electric current is detected.

12 Claims, 5 Drawing Figures

PHASE DETECTION IN AN INK JET SYSTEM PRINTER OF THE CHARGE AMPLITUDE CONTROLLING TYPE

BACKGROUND AND SUMMARY OF THE INVENTION

The present invention relates to an ink jet system printer of the charge amplitude controlling type and, more particularly, to a phase detection system in the ink jet system printer of the charge amplitude controlling type.

In an ink jet system printer of the charge amplitude controlling type, print distortion is mainly caused by interaction of ink droplets and air resistances occurring during travel of the ink droplets from a nozzle to a record receiving member. Accordingly, to minimize the print distortion, it is required to reduce the travel distance of the ink droplets.

A phase sensor electrode is conventionally disposed between a charging electrode and deflection means in order to detect charge conditions of phase detection ink droplets. The detection of the charge conditions of the phase detection ink droplets is necessary to perform accurate printing as disclosed in U.S. Pat. No. 4,025,926 entitled "PHASE SYNCHRONIZATION FOR INK JET SYSTEM PRINTER" on May 24, 1977, and in U.S. Pat. No. 3,769,632 entitled "DIGITAL PHASE CONTROL FOR AN INK JET RECORDING SYSTEM" on Oct. 30, 1973.

To minimize the above-mentioned travel distance of the ink droplets, it is very effective to omit the phase sensor electrode. Accordingly, an object of the present invention is to minimize a travel distance of ink droplets from a nozzle to a record receiving member in an ink jet system printer of the charge amplitude controlling type.

Another object of the present invention is to provide a novel phase detection system which does not require a phase sensor electrode disposed between a charging electrode and deflection means.

Still another object of the present invention is to provide a novel deflection means which can minimize the travel distance of the ink droplets in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a detection circuit is connected to an ink droplet issuance unit for detecting an electric current flowing through the ink droplet issuance unit to ink liquid contained in the ink droplet issuance unit. This is based on the inventors' discovery that the electric current flows through the ink droplet issuance unit to the ink liquid when an ink droplet is properly charged by charging means. An output signal of the detection circuit is used as a phase OK signal for conducting phase synchronization operation.

Deflection means comprises an upper electrode plate and a bottom electrode plate for establishing a high voltage electric field therebetween. The upper electrode plate is connected to a high voltage source, and the bottom electrode plate is grounded. The bottom electrode plate is fixed to a beam gutter for collecting ink droplets not contributing to actual writing operation, thereby minimizing the travel distance of the ink droplets.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
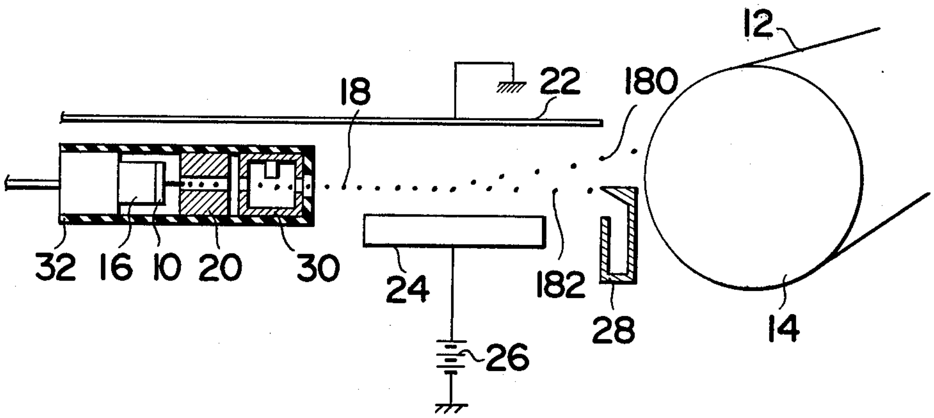
FIG. 1 PRIOR ART
FIG. 1 is a schematic view of an ink jet system printer of the charge amplitude controlling type of the prior art.

Referring now in detail to the drawings, and to facilitate a more complete understanding of the present invention, an ink jet system printer of the charge amplitude controlling type of the prior art will be first described with reference to FIG. 1.

Ink liquid is emitted from a nozzle 10 toward a record receiving paper 12 supported around a platen 14 under a predetermined pressure. An ultrasonic vibrator 16 is fixed to the nozzle 10 for developing ink droplets 18 at a given frequency. The thus developed ink droplets 18 are charged by a charging tunnel 20 to desired amplitudes in accordance with print information. The thus charged ink droplets 180 are deflected in accordance with the charges carried thereon while they travel through a high voltage electric field established by a pair of deflection electrodes 22 and 24. The upper deflection electrode 22 is grounded and mounted on a carriage. The bottom deflection electrode 24 is connected to a positive high voltage source 26.

The thus charged and deflected ink droplets 180 are directed to the record receiving paper 12 to print desired characters or patterns on the record receiving paper 12 in a dot matrix fashion. Ink droplets 182 not contributing to the actual writing operation are not charged nor deflected, and directed to a beam gutter 28 for collecting waste ink liquid for recirculation purposes.

A phase sensor electrode 30 is positioned near the charging tunnel 20 and the downstream of the charging tunnel 20 for detecting whether the ink droplets 18 are properly charged by the charging tunnel 20. That is, the phase sensor electrode 30 is provided for detecting whether the application of the charging signal is timed in agreement with the formation phase of the ink droplets 18. An output signal of the phase sensor electrode 30 is applied to a phase synchronization circuit such as disclosed in U.S. Pat. No. 3,769,632 entitled "DIGITAL PHASE CONTROL FOR AN INK JET RECORDING SYSTEM" on Oct. 30, 1973.

The above-mentioned nozzle 10, the ultrasonic vibrator 16, the charging tunnel 20 and the phase sensor electrode 30 are secured in an insulating holder 32 which is mounted on the carriage.

It has been discovered that print distortion in the aboveconstructed ink jet system printer is mainly caused by interaction of the charged ink droplets 180 and air resistance occurring during travel of the ink droplets 18 from the nozzle 10 to the record receiving paper 12. The air resistances were disclosed in U.S. Pat. No. 4,015,267 entitled "INK JET PRINTER HAVING AIR RESISTANCE DISTORTION CONTROL" on Mar. 29, 1977. Accordingly, to minimize the print distortion, it is required to reduce the travel distance of the ink droplets 18.

The possible, maximum value of the electric field established between the deflection electrodes 22 and 24 is about 23 KV/cm. Therefore, the deflection electrodes require a predetermined length along the travel course of the ink droplets 18. In the above-mentioned ink jet system printer of the charge amplitude controlling type of the prior art, the beam gutter 28 must be separated from the bottom deflection electrode plate 24 since the bottom deflection electrode plate 24 is connected to the high voltage source 26. Moreover, the provision of the phase sensor electrode 30 increases the travel distance of the ink droplets 18.

Figure 2:
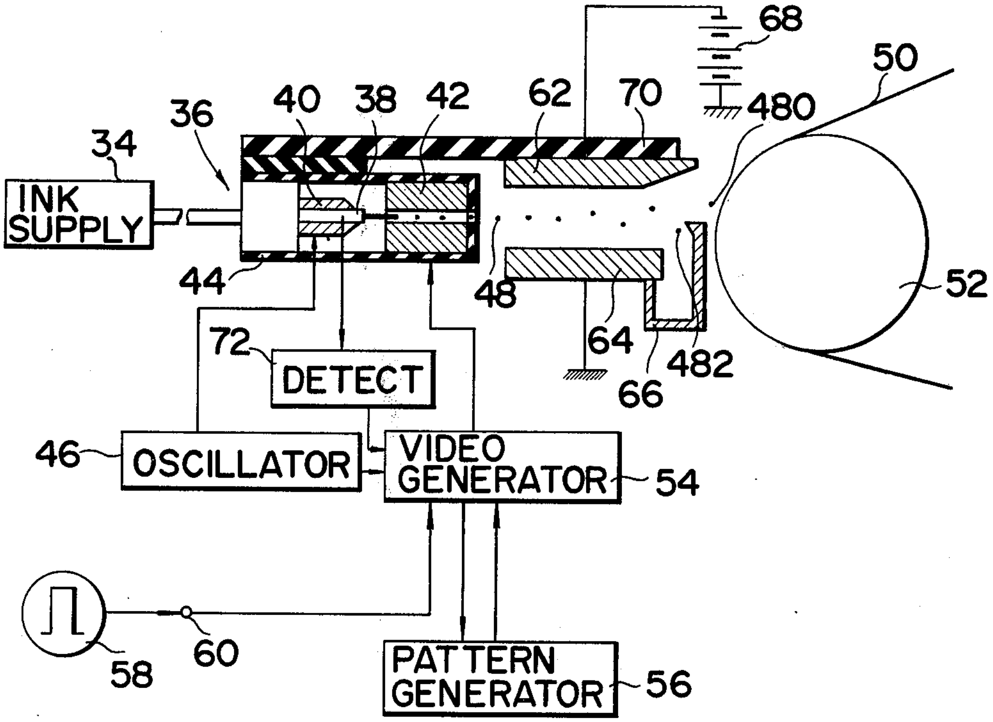
FIG. 2 is a block diagram of an embodiment of an ink jet system printer of the charge amplitude controlling type of the present invention.

FIG. 2 shows an embodiment of an ink jet system printer of the charge amplitude controlling type of the present invention.

Ink liquid is supplied from an ink liquid supply system 34 to an ink droplet issuance unit 36 under a predetermined pressure. The ink droplet issuance unit 36 comprises a nozzle 38, an ultrasonic vibrator 40, a charging tunnel 42 and an insulating holder 44. The insulating holder 44 is mounted on a carriage which is driven to reciprocate in the row direction.

The ultrasonic vibrator 40 is connected to receive an excitation signal derived from a master oscillator 46 for developing ink droplets 48 from the nozzle 38 toward a record receiving paper 50 which is supported around a platen 52. An output signal of the master oscillator 46 is also applied to a video generator 54, which functions, in combination with a pattern generator 56, to apply a charging signal to the charging tunnel 42 in accordance with print information 58 introduced from a data input terminal 60.

Ink droplets 480 charged by the charging signal are deflected while they pass through a constant high voltage electric field established by a pair of deflection electrodes 62 and 64 in accordance with charges carried thereon. The thus deflected ink droplets 480 are directed to the record receiving paper 50 for printing desired characters or patterns on the record receiving paper 50 in a dot matrix fashion. Ink droplets 482 not contributing to actual writing operation are not charged nor deflected, and directed to a beam gutter 66 for recirculation purposes. The bottom deflection electrode 64 is grounded and fixed to the beam gutter 66, thereby reducing the travel distance of the ink droplets 48. The upper deflection electrode 62 is connected to a negative high voltage source 68 in order to establish the constant high voltage electric field between the deflection electrodes 62 and 64. The two deflection electrodes 62 and 64 are spaced apart from each other by 3.5 mm, and the negative high voltage source 68 is $-8$ KV.

The upper deflection electrode 62 is fixed to an insulating holder 70, which is mounted on the carriage. That is, the upper deflection electrode 62 is driven to travel in the row direction in unison with the ink droplet issuance unit 36. A desired space is provided between the upper deflection electrode 62 and the platen 52.

To perform accurate phase synchronization between the charging signal application and the ink droplet formation phase, a phase detection signal is applied from the video generator 54 to the charging tunnel 42. The print charging signal has a negative polarity and the phase detection signal has a positive polarity. A typical phase detection signal was disclosed in U.S. Pat. No. 4,025,926 entitled "PHASE SYNCHRONIZATION FOR INK JET SYSTEM PRINTER" on May 24, 1977.

Figure 3:
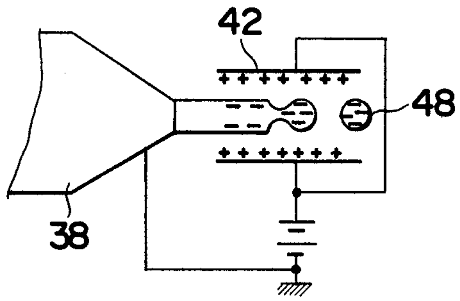
FIG. 3 is a schematic view showing charging conditions of ink droplets in an ink jet system printer of the charge amplitude controlling type.

FIG. 3 shows a condition where the phase detection signal of the positive polarity is applied to the charging tunnel 42.

Figure 5:
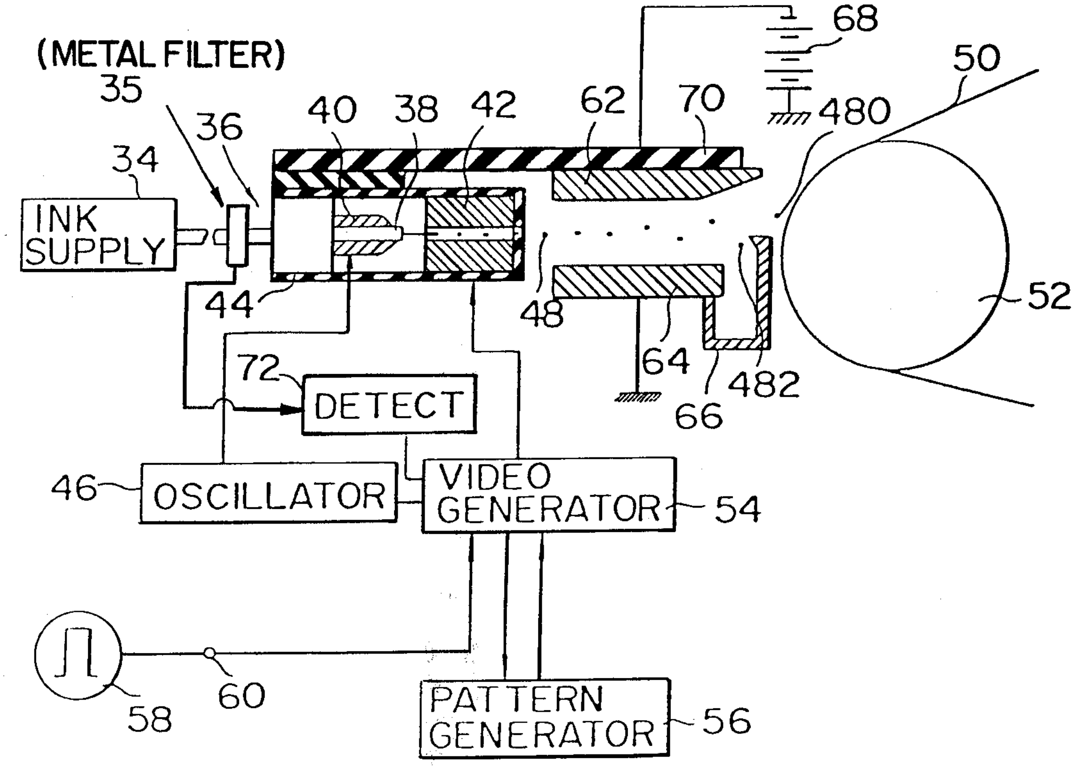
FIG. 5 is a circuit diagram of another embodiment of a phase detection circuit of the present invention.

When the positive signal is applied to the charging tunnel 42, negative charges are induced in the ink liquid near the charging tunnel 42 due to the electrostatic induction. The charges become maximum when the application of the phase detection signal is timed in agreement with the separation of the ink droplets 48 from the solid ink stream. At this moment, electric current flows from the ink droplet issuance unit 36 to the ink liquid. In case where the nozzle 38 is made of metal, the electric current flows from the nozzle 38 to the ink liquid. Contrarily, referring to FIG. 5, when the nozzle 38 is made of glass, the electric current flows from a metal portion 35 near the nozzle 38, to the ink liquid passing therethrough, for example, from a mask filter 35 provided adjacent to the nozzle 38.

FIG. 2 shows a system including a metal nozzle. A detection circuit 72 is connected to the nozzle 38 for detecting the above-mentioned electric current.

Figure 4:
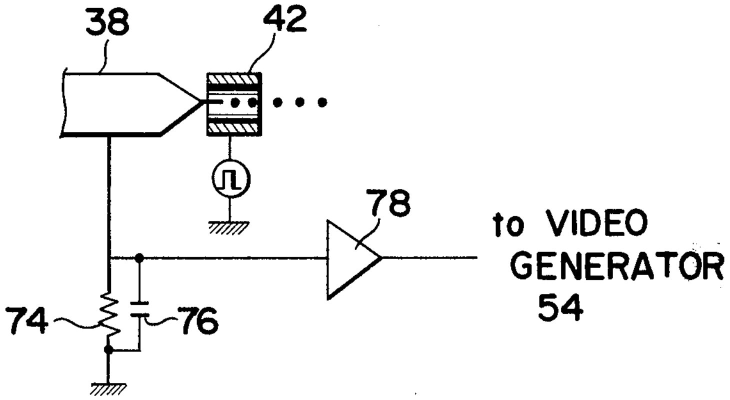
FIG. 4 is a circuit diagram of an embodiment of a phase detection circuit of the present invention.

FIG. 4 shows a typical construction of the detection circuit 72. Like element corresponding to those of FIGS. 2 and 3 are indicated by like numerals.

The detection circuit 72 mainly comprises a resistor 74, a capacitor 76 and an amplifier 78. Since the current value flowing through the nozzle 38 varies in response to the agreement degree of the signal application and the drop separation phase, an electric voltage appearing across the resistor 74 indicates the fact whether the application of the phase detection signal is accurately timed in agreement with the drop formation rhythm. An outout signal of the amplifier 78 is applied, as a phase OK signal, to a phase synchronization circuit included within the video generator 54.

A typical construction of the phase synchronization circuit was disclosed in U.S. Pat. No. 4,025,926 entitled "PHASE SYNCHRONIZATION FOR INK JET SYSTEM PRINTER" on May 24, 1977.

The capacitor 76 functions to remove noises derived from the charging tunnel 42. The capacitor 76 preferably has the capacitance of about 0.01 $\mu$F. In case where the resistor 74 is 1 MΩ and the phase detection signal is 30 V, a voltage of about 5 mV appears across the resistor 74 when the optimum phase relationship is achieved.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer of the charge amplitude controlling type including an ink droplet issuance unit and a phase detection system associated therewith, an ink liquid supply system being connected to said ink droplet issuance unit for supplying ink liquid thereto, a plurality of ink droplets are formed and emitted from a nozzle of said ink droplet issuance unit, are charged in a charging tunnel of said ink droplet issuance unit, are emitted from said ink droplet issuance unit and travel toward a record receiving medium, said phase detection system comprising:

metal filter means positioned between said ink droplet issuance unit and said ink liquid supply system, said metal filter means receiving said ink liquid from said ink liquid supply system and being in contact with said ink liquid passing therethrough, an electric current passing through said metal filter means to said ink liquid passing therethrough only when the imposition of a charge on said ink droplets passing through the charging tunnel is synchronized with the formation of said ink droplets at the nozzle; and detection circuit means connected to said metal filter means for detecting said electric current flowing in said ink liquid passing through said metal filter means and developing an output signal representative thereof;

said ink jet system printer further including a synchronization system means responsive to said output signal from said detection circuit means for developing an output signal in response thereto, said output signal from said synchronization circuit means energizing said charging tunnel of said ink droplet issuance unit thereby synchronizing the imposition of a charge on said ink droplets in said charging tunnel with the formation of said ink droplets from said nozzle of said ink droplet issuance unit.

2. The ink jet system printer of the charge amplitude controlling type of claim 1, wherein said nozzle of said ink droplet issuance unit comprises a glass material.

3. The phase detection system of claim 1, wherein said detection circuit means comprises:

resistor means interposed between said metal filter means and a grounded terminal for developing a voltage proportional to said electric current flowing in said ink liquid and passing through said metal filter means; and amplifier means connected across said resistor means for applying said voltage across said resistor means.

4. A phase detection system of claim 3 wherein said electric current is induced in said ink droplets when said ink droplets are charged in said ink droplet issuance unit, the induced electric current flowing from said ink droplets to said metal member, said detection circuit means generating said output signal in response to the detection of said induced electric current.

5. An ink jet system printer of the charge amplitude controlling type, comprising:

ink liquid supply source means for providing a supply of ink liquid;

ink droplet issuance unit means receiving said ink liquid from said ink liquid supply source means for emitting a plurality of charged ink droplets therefrom, said ink droplet issuance unit means including, nozzle means for emitting a plurality of ink droplets therefrom, vibrator means connected to said nozzle means for vibrating said nozzle means and producing said plurality of ink droplets being emitted therefrom; and charging tunnel means for charging said plurality of ink droplets with a charge in accordance with a print information signal, said plurality of charged ink droplets being emitted from said charging tunnel means;

deflection plate means for deflecting said plurality of charged ink droplets;

a print receiving medium for receiving selected ones of said plurality of charged ink droplets passing through said deflection plate means; and synchronization means for synchronizing the imposition of said charge on said plurality of ink droplets in said charging tunnel with the formation of said ink droplets being emitted from said nozzle means, said synchronization means including, metal member means interposed between said ink liquid supply source means and said ink droplet issuance unit means, said metal member means receiving said ink liquid from said ink liquid supply source means and being in contact with said ink liquid passing therethrough, an electric current flowing through said metal member means to said ink liquid passing therethrough only when the imposition of said charge on said ink droplets passing through said charging tunnel is synchronized with the formation of the ink droplets at said nozzle means;

detection means connected to said metal member means for detecting said electric current flowing through said ink liquid in the metal member means and developing an output signal in accordance therewith; and print information signal generating means for developing said print information signal when energized by said output signal from said detection means, said print information signal energizing said charging tunnel thereby synchronizing the imposition of said charge with the formation of said ink droplets from said nozzle means.

6. The ink jet system printer of the charge amplitude controlling type of claim 5, wherein said detection means comprises a resistor means interposed between said metal member means and a grounded terminal for developing a voltage there across; and amplifier means connected to a connection point where said metal member means and said resistor means interconnect for amplifying said voltage across said resistor means.

7. The ink jet system printer of the charge amplitude controlling type of claim 6 or 5, wherein said deflection plate means comprises an upper deflection electrode connected to a high voltage source for supplying a constant high voltage and a bottom deflection electrode maintained at a ground potential.

8. The ink jet system printer of the charge amplitude controlling type of claim 7, wherein said ink droplet issuance unit means, and said upper deflection electrode are mounted on a carriage, said carriage being driven to reciprocate in the row direction.

9. The ink jet system printer of the charge amplitude controlling type of claim 7, further comprising:

beam gutter means disposed in front of said record receiving medium for collecting ink droplets not contributing to said writing operation; and wherein said bottom deflection electrode is fixed to said beam gutter.

10. An ink jet system printer of the charge amplitude controlling type of claim 6 wherein said electric current is induced in said ink droplets when said ink droplets pass through said charging means in response to the energization of said charging means of said print information, the induced electric current flowing from said ink droplets through said metal member, said phase detection means detecting said induced electric current and generating said output signal in response thereto.

11. The ink jet system printer of the charge amplitude controlling type of claim 5, wherein said nozzle means comprises a glass nozzle.

12. An ink jet system printer of the charge amplitude controlling type, comprising:

ink liquid supply source means for providing a supply of ink liquid;

ink droplet issuance unit means receiving said ink liquid from said ink liquid supply source means for emitting a plurality of charged ink droplets therefrom, said ink droplet issuance unit means including, metal nozzle means receiving said ink liquid for emitting a plurality of ink droplets therefrom, said metal nozzle means being in contact with said ink liquid passing therethrough;

vibrator means connected to said nozzle means for vibrating said nozzle means and producing said plurality of ink droplets being emitted therefrom; and charging tunnel means for charging said plurality of ink droplets with a charge in accordance with a print information signal, an electric current flowing through said metal nozzle means to said ink liquid passing therethrough only when the imposition of said charge on said ink droplets passing through said charging tunnel is synchronized with the formation of said ink droplets at said nozzle means, said plurality of charged ink droplets being emitted from said charging tunnel means;

deflection plate means for deflecting said plurality of charged ink droplets emitted from said charging tunnel means;

a print receiving medium for receiving selected ones of said plurality of charged ink droplets passing through said deflection plate means; and synchronization means for synchronizing the imposition of said charge on said plurality of ink droplets in said charging tunnel with the formation of said ink droplets being emitted from said nozzle means, said synchronization means including, detection means connected to said metal nozzle means for detecting said electric current flowing through said ink liquid in the metal nozzle means and developing an output signal in accordance therewith, and print information signal generating means for developing said print information signal when energized by said output signal from said detection means, said print information signal energizing said charging tunnel thereby synchronizing the imposition of said charge with the formation of said ink droplets from said nozzle means.

* * * * *